(12) United States Patent
Sonoo et al.

(10) Patent No.: US 12,548,770 B2
(45) Date of Patent: Feb. 10, 2026

(54) POSITIVE ELECTRODE ACTIVE MATERIAL FOR NON-AQUEOUS ELECTROLYTE SECONDARY BATTERY, AND METHOD OF PRODUCING SAME

(71) Applicant: NICHIA CORPORATION, Anan (JP)

(72) Inventors: Masato Sonoo, Anan (JP); Masahiro Murayama, Tokushima (JP); Kenichi Kobayashi, Tokushima (JP); Hideaki Hamada, Anan (JP); Jota Morimoto, Tokushima (JP)

(73) Assignee: NICHIA CORPORATION, Anan (JP)

( * ) Notice: Subject to any disclaimer, the term of this patent is extended or adjusted under 35 U.S.C. 154(b) by 581 days.

(21) Appl. No.: 17/814,814

(22) Filed: Jul. 25, 2022

(65) Prior Publication Data

US 2023/0045181 A1 Feb. 9, 2023

(30) Foreign Application Priority Data

Jul. 26, 2021 (JP) ................................ 2021-121962
Jun. 8, 2022 (JP) ................................ 2022-093178

(51) Int. Cl.
*H01M 4/131* (2010.01)
*H01M 4/04* (2006.01)
(Continued)

(52) U.S. Cl.
CPC ......... *H01M 4/525* (2013.01); *H01M 4/0404* (2013.01); *H01M 4/0471* (2013.01);
(Continued)

(58) Field of Classification Search
CPC .... H01M 10/052; H01M 4/131; H01M 4/366; H01M 4/505; H01M 4/525
See application file for complete search history.

(56) References Cited

U.S. PATENT DOCUMENTS

| 6,881,520 B1 | 4/2005 | Li |
| 2005/0260495 A1 | 11/2005 | Onnerud et al. |

(Continued)

FOREIGN PATENT DOCUMENTS

| EP | 3920275 A1 | 12/2021 |
| JP | H07235292 A | 9/1995 |

(Continued)

OTHER PUBLICATIONS

USPTO Non-Final Office Action issued on Jun. 3, 2025 in U.S. Appl. No. 17/759,422 (26 pages).

(Continued)

*Primary Examiner* — Kevin E Yoon
(74) *Attorney, Agent, or Firm* — Hunton Andrews Kurth LLP

(57) ABSTRACT

A method of producing a positive electrode for a non-aqueous electrolyte secondary battery, includes: providing a lithium transition metal composite oxide having a layered structure, having a ratio $D_{50}/D_{SEM}$ of 1 or more and 4 or less, and having a certain content of nickel and a certain content of cobalt; bringing the lithium transition metal composite oxide into contact with a cobalt compound to obtain an adhered material; heat-treating the adhered material at a temperature higher than 700° C. and lower than 1100° C. to obtain a heat-treated product; obtaining a positive electrode composition containing the heat-treated product, a conductive auxiliary agent, and a binder; and applying and pressurizing the positive electrode composition onto a collector to form an active material layer having a density of 2.7 g/cm³ or more and 3.9 g/cm³ or less on the collector.

4 Claims, 1 Drawing Sheet

(51) Int. Cl.
*H01M 4/36* (2006.01)
*H01M 4/505* (2010.01)
*H01M 4/525* (2010.01)
*H01M 4/02* (2006.01)

(52) U.S. Cl.
CPC ......... *H01M 4/131* (2013.01); *H01M 4/366* (2013.01); *H01M 4/505* (2013.01); *H01M 2004/021* (2013.01); *H01M 2004/028* (2013.01)

(56) References Cited

U.S. PATENT DOCUMENTS

| | | | |
|---|---|---|---|
| 2012/0009474 A1 | 1/2012 | Yanagihara et al. | |
| 2012/0270107 A1 | 10/2012 | Toya et al. | |
| 2013/0302686 A1 | 11/2013 | Yamamoto et al. | |
| 2013/0318780 A1 | 12/2013 | Tsunozaki et al. | |
| 2014/0072874 A1 | 3/2014 | Kim et al. | |
| 2014/0197357 A1 | 7/2014 | Ofer et al. | |
| 2016/0181611 A1 | 6/2016 | Cho et al. | |
| 2016/0197341 A1 | 7/2016 | Lu et al. | |
| 2017/0133668 A1* | 5/2017 | Kim | H01M 4/505 |
| 2017/0288221 A1 | 10/2017 | Kobayashi et al. | |
| 2017/0288222 A1 | 10/2017 | Kobayashi | |
| 2017/0288223 A1 | 10/2017 | Ogawa et al. | |
| 2018/0013145 A1 | 1/2018 | Choi et al. | |
| 2018/0040889 A1 | 2/2018 | Choi et al. | |
| 2018/0040890 A1 | 2/2018 | Choi et al. | |
| 2018/0040891 A1 | 2/2018 | Choi et al. | |
| 2018/0040896 A1 | 2/2018 | Choi et al. | |
| 2018/0351175 A1* | 12/2018 | Kawasaki | H01M 4/525 |
| 2019/0067689 A1 | 2/2019 | Hong et al. | |
| 2019/0221843 A1 | 7/2019 | Kosaka et al. | |
| 2019/0296349 A1 | 9/2019 | Cho et al. | |
| 2019/0319257 A1 | 10/2019 | Ogawa et al. | |
| 2020/0106098 A1 | 4/2020 | Kobayashi | |
| 2020/0335787 A1 | 10/2020 | Chae et al. | |
| 2020/0411857 A1* | 12/2020 | Sawada | H01M 4/525 |
| 2021/0119204 A1 | 4/2021 | Celasun et al. | |
| 2021/0159496 A1 | 5/2021 | Mitsumoto et al. | |
| 2022/0190316 A1* | 6/2022 | Seo | C01G 53/50 |
| 2023/0085645 A1* | 3/2023 | Sonoo | H01M 4/505 |
| | | | 429/231.95 |

FOREIGN PATENT DOCUMENTS

| | | |
|---|---|---|
| JP | H0955210 A | 2/1997 |
| JP | 2000515300 A | 11/2000 |
| JP | 2002075367 A | 3/2002 |
| JP | 2003292322 A | 10/2003 |
| JP | 2006012433 A | 1/2006 |
| JP | 2006019229 A | 1/2006 |
| JP | 2006199229 A | 8/2006 |
| JP | 2008500259 A | 1/2008 |
| JP | 2008103181 A | 5/2008 |
| JP | 2009266433 A | 11/2009 |
| JP | 2010092848 A | 4/2010 |
| JP | 2011116580 A | 6/2011 |
| JP | 2011146390 A | 7/2011 |
| JP | 2012018827 A | 1/2012 |
| JP | 2012160420 A | 8/2012 |
| JP | 2012221855 A | 11/2012 |
| JP | 2014528891 A | 10/2014 |
| JP | 2015103306 A | 6/2015 |
| JP | 2016051503 A | 4/2016 |
| JP | 2016105358 A | 6/2016 |
| JP | 2016528707 A | 9/2016 |
| JP | 2017007918 A | 1/2017 |
| JP | 2017188443 A | 10/2017 |
| JP | 2017188444 A | 10/2017 |
| JP | 2017188445 A | 10/2017 |
| JP | 2018008866 A | 1/2018 |
| JP | 2018014208 A | 1/2018 |
| JP | 2018020949 A | 2/2018 |
| JP | 2018020950 A | 2/2018 |
| JP | 2018020951 A | 2/2018 |
| JP | 2018022676 A | 2/2018 |
| JP | 2018125305 A | 8/2018 |
| JP | 2019046795 A | 3/2019 |
| JP | 2019125510 A | 7/2019 |
| JP | 6650064 B1 | 1/2020 |
| JP | 2020009560 A | 1/2020 |
| JP | 2020504415 A | 2/2020 |
| JP | 2021508154 A | 2/2021 |
| JP | 2021508410 A | 3/2021 |
| WO | 9749136 A1 | 12/1997 |
| WO | 2005114768 A1 | 12/2005 |
| WO | 2012108513 A1 | 8/2012 |
| WO | 2015075520 A2 | 5/2015 |
| WO | 2018088320 A1 | 5/2018 |
| WO | 2019044734 A1 | 3/2019 |
| WO | WO-2019120973 A1 * | 6/2019 ............ C01G 53/42 |
| WO | 2021153546 A1 | 8/2021 |

OTHER PUBLICATIONS

USPTO Final Office Action issued on Nov. 5, 2025 in co-pending U.S. Appl. No. 17/759,422 (13 pages).

* cited by examiner

POSITIVE ELECTRODE ACTIVE MATERIAL FOR NON-AQUEOUS ELECTROLYTE SECONDARY BATTERY, AND METHOD OF PRODUCING SAME

CROSS-REFERENCE TO RELATED APPLICATIONS

This application claims priority to Japanese Patent Application No. 2021-121962, filed on Jul. 26, 2021 and Japanese Patent Application No. 2022-093178, filed on Jun. 8, 2022, the disclosure of which are hereby incorporated by reference in its entirety.

BACKGROUND

Field of the Invention

The present disclosure relates to a positive electrode active material for a non-aqueous electrolyte secondary battery and a method of producing the same.

Description of the Related Art

High output characteristics are required for positive electrode active materials for non-aqueous electrolyte secondary batteries to be used in large power equipment such as electric vehicles. To obtain high output characteristics, a positive electrode active material having a structure of secondary particles formed of many aggregated primary particles is considered to be effective. However, in such a positive electrode active material, the secondary particles may be cracked due to pressure treatment at the time of forming an electrode, expansion/contraction at the time of charging/discharging, etc. In this regard, a method has been proposed for producing a positive electrode active material containing lithium transition metal composite oxide particles which are single particles, or in which the number of primary particles constituting one secondary particle is reduced (see, e.g., Japanese Laid-Open Patent Publication No. 2017-188443).

On the other hand, a technique has been proposed for coating a lithium transition metal composite oxide containing nickel used as a core material with a lithium transition metal composite oxide containing cobalt, and this is considered to improve stability while maintaining capacity characteristics (see, e.g., Japanese Laid-Open Patent Publication No. 2006-019229).

SUMMARY

A first exemplary aspect of the present disclosure provides a method of manufacturing a positive electrode for a non-aqueous electrolyte secondary battery. This method may include: providing a lithium transition metal composite oxide having a layered structure, having a ratio $D_{50}/D_{SEM}$ of 1 or more and 4 or less, wherein $D_{50}$ is a 50% particle diameter in a volume-based cumulative particle size distribution and $D_{SEM}$ is an average particle diameter based on electron microscope observation, and having a ratio of a number of moles of nickel to a total number of moles of metals other than lithium of 0.3 or more and less than 1, and a ratio of a number of moles of cobalt to the total number of moles of metals other than lithium of 0 or more and less than 0.5; bringing the lithium transition metal composite oxide into contact with a cobalt compound to obtain an adhered material; heat-treating the adhered material at a temperature higher than 700° C. and lower than 1100° C. to obtain a heat-treated product; obtaining a positive electrode composition containing the heat-treated product, a conductive auxiliary agent, and a binder; and applying and pressurizing the positive electrode composition onto a collector to form an active material layer having a density of 2.7 g/cm³ or more and 3.9 g/cm³ or less on the collector. An embodiment of the present disclosure allows for providing a method of producing a positive electrode for a non-aqueous electrolyte secondary battery capable of constituting a non-aqueous electrolyte secondary battery having good storage characteristics while maintaining good output characteristics.

A second exemplary embodiment of the present disclosure provides a positive electrode for a non-aqueous electrolyte secondary battery comprising a collector and an active material layer disposed on the collector. This active material layer may have a density of 2.7 g/cm³ or more and 3.9 g/cm³ or less and may contain a positive electrode active material, a conductive auxiliary agent, and a binder. The positive electrode active material may have a ratio $D_{50}/D_{SEM}$ of 1 or more and 4 or less, wherein $D_{50}$ is a 50% particle diameter in a volume-based cumulative particle size distribution and $D_{SEM}$ is an average particle diameter based on electron microscope observation, may comprise or be formed of particles containing the lithium transition metal composite oxide having a layered structure and containing at least nickel and cobalt, and may have a ratio of a number of moles of nickel to a total number of moles of metals other than lithium of 0.3 or more and less than 1, and a ratio of a number of moles of cobalt to the total number of moles of metals other than lithium of 0.01 or more and less than 0.5. In the particles containing the lithium transition metal composite oxide constituting the active material layer, the ratio of the number of moles of cobalt to the total number of moles of metals other than lithium may be larger in a second region where a depth from a particle surface is about 10 nm or less than in a first region where a depth from a particle surface is about 500 nm. An embodiment of the present disclosure may provide a positive electrode for a non-aqueous electrolyte secondary battery capable of constituting a non-aqueous electrolyte secondary battery having good storage characteristics while maintaining good output characteristics.

DETAILED DESCRIPTION

Figure 1:
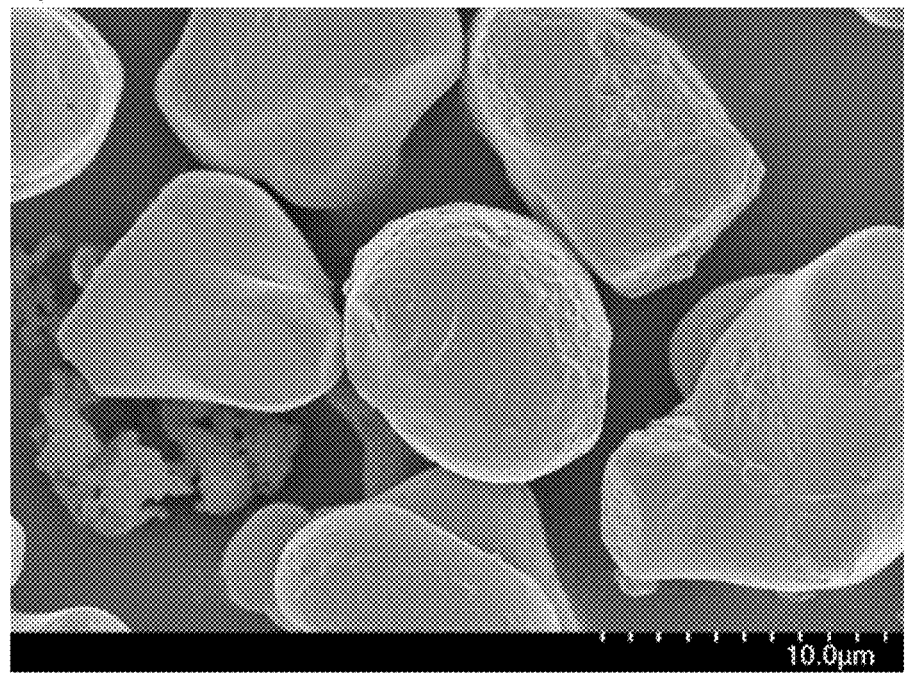
FIG. 1 is an exemplary scanning electron microscope (SEM) image of a positive electrode active material according to Reference Example 1.

The term "step" as used herein encompasses not only an independent step but also a step not clearly distinguishable from another step as long as the intended purpose of the step is achieved. If multiple substances correspond to a component in a composition, the content of the component in the composition means the total amount of the multiple substances present in the composition unless otherwise specified. Embodiments of the present invention will now be described in detail. The embodiments described below are exemplifications of a positive electrode active material for a non-aqueous electrolyte secondary battery and a method of producing the same for embodying the technical ideas of the present invention, and the present invention is not limited to the positive electrode active material for a non-aqueous electrolyte secondary battery and the method of producing the same described below.

Method of Producing Positive Electrode Active Material for Non-Aqueous Electrolyte Secondary Battery A method of producing a positive electrode active material for a non-aqueous electrolyte secondary battery comprises: providing a lithium transition metal composite oxide having a ratio $D_{50}/D_{SEM}$ of a 50% particle diameter $D_{50}$ in a volume-based cumulative particle size distribution to an average particle diameter $D_{SEM}$ based on electron microscope observation of 1 or more and 4 or less, having a layered structure, and having a ratio of the number of moles of nickel to the total number of moles of metals other than lithium of 0.3 or more and less than 1, and a ratio of the number of moles of cobalt to the total number of moles of metals other than lithium of 0 or more and less than 0.5; bringing the lithium transition metal composite oxide into contact with a cobalt compound to obtain an adhered material; heat-treating the adhered material at a temperature higher than 700° C. and lower than 1100° C. to obtain a heat-treated product; obtaining a positive electrode composition containing the heat-treated product, a conductive auxiliary agent, and a binder; and applying and pressurizing the positive electrode composition onto a collector to form an active material layer having a density of 2.7 g/cm$^3$ or more and 3.9 g/cm$^3$ or less on the collector.

By causing the cobalt compound to adhere to the lithium transition metal composite oxide-containing particles (hereinafter collectively referred to simply as "single particles") having $D_{50}/D_{SEM}$ of 1 or more and 4 or less and being single particles or in which the number of primary particles constituting one secondary particle is reduced, and performing a heat treatment at a specific temperature, a positive electrode active material capable of achieving good output characteristics in anon-aqueous electrolyte secondary battery is produced. This can be thought to be because, for example, a high concentration of cobalt is present in the vicinity of the surface of the lithium transition metal composite oxide-containing particle due to the cobalt compound adhering to the surface.

When a non-aqueous electrolyte secondary battery is formed by using, as a positive electrode, an electrode containing the specific lithium transition metal composite oxide as a positive electrode active material and including an active material layer containing a conductive auxiliary agent and a binder and formed to have a specific density, the battery has good storage characteristics while maintaining good output characteristics. The specific lithium transition metal composite oxide is single-particle, has a layered structure, and has the ratio of the number of moles of nickel to the total number of moles of metals other than lithium is 0.3 or more and less than 1, and the ratio of the number of moles of cobalt to the total number of moles of metals other than lithium of 0.01 or more and less than 0.5. When the surface of the single-particle lithium transition metal composite oxide has a region with high concentration of cobalt, a gas generated by a direct reaction between an alkaline component contained in the lithium transition metal composite oxide and an electrolytic solution may be reduced. In the case of secondary particles comprising or formed of a large number of aggregated primary particles, the generation of gas due to contact with the electrolytic solution may increase due to particle cracking caused by pressing during the production of the positive electrode. On the other hand, because single particles hardly crack, it is thought that the gas generation due to the reaction with the electrolytic solution can be further reduced by increasing the density of the active material layer to a specific density. In one aspect of the present disclosure, the formation of the active material layer at a specific density increases a contact area between the conductive auxiliary agent and the surface of the single particle or a contact area between the surfaces of the single particles, which relatively reduces the number of portions where the electrolytic solution and the surface of the single particle come into direct contact, so that the gas generation may be reduced, and the storage characteristics are provably improved.

Providing Step

In the providing step, a lithium transition metal composite oxide having $D_{50}/D_{SEM}$ of 1 or more and 4 or less and a layered structure is provided, and the lithium transition metal composite oxide has a composition in which a ratio of the number of moles of nickel to the total number of moles of metals other than lithium is 0.3 or more and less than 1, and a ratio of the number of moles of cobalt to the total number of moles of metals other than lithium is 0 or more and less than 0.5. The lithium transition metal composite oxide contains at least lithium, nickel, and cobalt, and may further contain at least one metal element selected from the group consisting of manganese, aluminum, etc. The lithium transition metal composite oxide may appropriately be selected from commercially available products, or may be provided by preparing a lithium transition metal composite oxide having a desired composition and structure.

The ratio of the number of moles of nickel to the total number of moles of metals other than lithium in the lithium transition metal composite oxide provided in the providing step may be, for example, 0.3 or more and less than 1. The lower limit of the ratio of the number of moles of nickel to the total number of moles of metals other than lithium is preferably 0.31 or more, and more preferably 0.32 or more. The upper limit of the ratio of the number of moles of nickel to the total number of moles of metals other than lithium is preferably 0.98 or less, more preferably 0.8 or less, and particularly preferably 0.6 or less. When the molar ratio of nickel is within the range described above, both charge/discharge capacity at high voltage and cycle characteristics may be achieved in the non-aqueous electrolyte secondary battery.

The ratio of the number of moles of cobalt to the total number of moles of metals other than lithium in the lithium transition metal composite oxide provided in the providing step may be, for example, 0 or more and less than 0.5 and is preferably 0.15 or more and 0.45 or less, and more preferably 0.3 or more and 0.4 or less from the viewpoint of charge/discharge capacity.

The lithium transition metal composite oxide provided in the providing step may further contain at least one metal element $M^1$ selected from the group consisting of manganese and aluminum. When the lithium transition metal composite oxide contains the metal element $M^1$, a ratio of the number of moles of $M^1$ to the total number of moles of metals other than lithium may be, for example, greater than 0 and less than 0.5, and is preferably 0.15 or more and 0.45 or less, and more preferably 0.3 or more and 0.4 or less from the viewpoint of safety.

The lithium transition metal composite oxide provided in the providing step may further contain at least one metal element $M^2$ selected from the group consisting of boron, sodium, magnesium, silicon, phosphorus, sulfur, potassium, calcium, titanium, vanadium, chromium, zinc, strontium, yttrium, zirconium, niobium, molybdenum, indium, tin, barium, lanthanum, cerium, neodymium, samarium, europium, gadolinium, tantalum, tungsten, bismuth, etc. A ratio of the number of moles of $M^2$ to the total number of moles of metals other than lithium may be, for example, 0 or more and 0.1 or less, preferably 0.001 or more and 0.05 or less.

The ratio of the number of moles of lithium to the total number of moles of metals other than lithium in the lithium transition metal composite oxide provided in the providing step may be, for example, 0.95 or more and 1.5 or less, preferably 1 or more and 1.3 or less.

In the composition of the lithium transition metal composite oxide provided in the providing step, the ratio of the number of moles of nickel, cobalt, and manganese may be, for example, nickel:cobalt:manganese=(0.3 to 0.95):(0 to 0.5):(0 to 0.5), preferably (0.3 to 0.6):(0.15 to 0.45):(0.15 to 0.45), more preferably (0.3 to 0.4):(0.3 to 0.4):(0.3 to 0.4).

The composition of the lithium transition metal composite oxide provided in the provision step may be, for example, a composition represented by Formula (1). The composition of the lithium transition metal composite oxide in this case refers to the composition of the lithium transition metal composite oxide as a whole.

$$Li_pNi_xCo_yM^1_zM^2_wO_2 \quad (1)$$

where $0.95 \leq p \leq 1.5$, $0.3 \leq x < 1$, $0 \leq y < 0.5$, $0 \leq z < 0.5$, $0 \leq w \leq 0.1$, and $x+y+z+w \leq 1$ are satisfied, $M^1$ is at least one selected from the group consisting of Al and Mn, and $M^2$ is at least one selected from the group consisting of B, Na, Mg, Si, P, S, K, Ca, Ti, V, Cr, Zn, Sr, Y, Zr, Nb, Mo, In, Sn, Ba, La, Ce, Nd, Sm, Eu, Gd, Ta, W, and Bi. Additionally, $0.9 \leq x+y+z+w$ may be satisfied.

The lithium transition metal composite oxide provided in the providing step may be in a form of so-called single particles composed of 4 or less primary particles, for example. The lithium transition metal composite oxide may have the ratio $D_{50}/D_{SEM}$ of the 50% particle diameter $D_{50}$ in a volume-based cumulative particle size distribution to the average particle diameter $D_{SEM}$ based on electron microscope (SEM) observation of 1 or more and 4 or less.

In the lithium transition metal composite oxide provided in the providing step, $D_{50}/D_{SEM}$ of 1 indicates a single particle, and $D_{50}/D_{SEM}$ closer to 1 indicates a smaller number of constituent primary particles. $D_{50}/D_{SEM}$ is preferably 1 or more and 4 or less from the viewpoint of durability, preferably 3.5 or less, more preferably 3 or less, further preferably 2.5 or less, and particularly preferably 2 or less from the viewpoint of output density.

In the lithium transition metal composite oxide provided in the providing step, the average particle diameter $D_{SEM}$ based on electron microscope observation is, for example, 0.1 μm or more and 20 μm or less from the viewpoint of durability, and is preferably 0.3 μm or more, more preferably 0.5 μm or more, and preferably 15 μm or less, more preferably 10 μm or less, further preferably 8 μm or less, and particularly preferably 5 μm or less from the viewpoint of output density.

The average particle diameter $D_{SEM}$ based on electron microscope observation is an average value of the spherical equivalent diameters of the primary particles measured from a scanning electron microscope (SEM) image. Specifically, the average particle diameter $D_{SEM}$ is obtained as follows. By using a scanning electron microscope, observation is performed at a magnification ranging from 1000 times to 10000 times depending on a particle diameter. One hundred primary particles having confirmable particle contours and a size within ±1 μm from the volume average particle diameter ($D_{50}$) of the particle containing the lithium transition metal composite oxide are selected. Using an image processing software, the contours of the selected primary particles are traced, so that contour lengths of the selected primary particles are obtained. The sphere-equivalent diameters are calculated from the contour lengths, and the average particle diameter $D_{SEM}$ is obtained as an arithmetic mean value of the obtained sphere-equivalent diameters.

The 50% particle diameter $D_{50}$ of the lithium transition metal composite oxide provided in the provision step is, for example, 1 μm or more and 30 μm or less, preferably 1.5 μm or more, more preferably 3 μm or more, and is preferably 10 μm or less and more preferably 5.5 μm or less from the viewpoint of output density.

The 50% particle diameter $D_{50}$ is obtained as a particle diameter corresponding to 50% volume accumulation from the small diameter side in the volume-based cumulative particle size distribution measured under wet conditions by using a laser diffraction particle size distribution measuring device. Similarly, a 90% particle diameter $D_{90}$ and a 10% particle diameter $D_{10}$ described later are obtained as particle diameters corresponding to 90% accumulation and 10% accumulation from the small diameter side, respectively.

A ratio of the 90% particle diameter $D_{90}$ to the 10% particle diameter $D_{10}$ in the volume-based cumulative particle diameter distribution of the lithium transition metal composite oxide provided in the providing step indicates a spread of the particle size distribution, and when the value is smaller, the particle diameter is more uniform. $D_{90}/D_{10}$ may be, for example, 4 or less, and is preferably 3 or less, more preferably 2.5 or less, from the viewpoint of output density. The lower limit of $D_{90}/D_{10}$ may be 1.2 or more, for example.

For the lithium transition metal composite oxide having $D_{50}/D_{SEM}$ of 1 or more and 4 or less provided in the providing step, reference can be made to Japanese Laid-Open Patent Publication No. 2017-188443 (US Patent Application Publication No. 2017-0288221), Japanese Laid-Open Patent Publication No. 2017-188444 (US Patent Application Publication No. 2017-0288222), Japanese Laid-Open Patent Publication No. 2017-188445 (US Patent Application Publication No. 2017-0288223), etc.

The lithium transition metal composite oxide provided in the providing step has a composition containing nickel. From the viewpoint of the initial efficiency of the non-aqueous electrolyte secondary battery, the lithium transition metal composite oxide preferably has a nickel element disorder of 4.0% or less, more preferably 2.0% or less, further preferably 1.5% or less, which is obtained by an X-ray diffraction method. The nickel element disorder means a chemical disorder of transition metal ions (nickel ions) that should occupy original sites. In the lithium transition metal composite oxide having a layered structure, the disorder is typically a switch between an alkali metal ion that should occupy a site represented by 3b (3b site, the same applies hereinafter) and a transition metal ion that should occupy a 3a site when denoted by the Wyckoff symbols. A smaller nickel element disorder is preferable because the initial efficiency is more improved.

The nickel element disorder in the lithium transition metal composite oxide may be obtained by an X-ray diffraction method. The X-ray diffraction spectrum of the lithium transition metal composite oxide is measured with a CuKα ray. A composition model is set to $(Li_{1-d}Ni_d)(Ni_xCo_yMn_z)$ $O_2(x+y+z=1)$, and the structure is optimized by Rietveld analysis based on the obtained X-ray diffraction spectrum. The percentage of d calculated as a result of the structural optimization is obtained as the value of the nickel element disorder.

Specifically, the lithium transition metal composite oxide provided in the providing step may be prepared as follows. A method of preparing the lithium transition metal composite oxide may comprise, for example, a precursor provision step of providing a precursor and a synthesis step of synthesizing a lithium transition metal composite oxide from the precursor and a lithium compound.

In the precursor provision step, a precursor containing a composite oxide containing nickel and cobalt (hereinafter, also simply referred to as a composite oxide) is provided. The precursor may be provided by appropriately selecting from commercially available products, or by preparing a composite oxide having a desired constitution using a conventional method. Examples of a technique for obtaining a composite oxide having a desired composition include a technique in which raw material compounds (hydroxide, a carbonate compound, etc.) are mixed according to an intended composition and the compounds are decomposed into a composite oxide through heat treatment, and a coprecipitation technique in which solvent-soluble raw material compounds are dissolved in a solvent and temperature adjustment, pH adjustment, addition of a complexing agent, etc., are performed to obtain precipitates having an intended composition and the precipitates heat-treating to obtain a composite oxide. An example of a method of producing a composite oxide will hereinafter be described.

A method of obtaining a composite oxide with a coprecipitation method may include a seed generation step of obtaining seed crystals by adjusting a pH etc., of a mixed solution containing metal ions in a desired constituent ratio, a crystallization step of growing the generated seed crystals to obtain a composite hydroxide having desired characteristics, and a step of obtaining a composite oxide through heat treatment of the obtained composite hydroxide. For details of the method of obtaining a composite oxide, reference can be made to Japanese Laid-Open Patent Publication Nos. 2003-292322 and 2011-116580 (US Patent Application Publication No. 2012-0270107) etc.

In the seed generation step, a liquid medium containing seed crystals is prepared by adjusting a pH of a mixed solution containing nickel ions and cobalt ions in a desired constituent ratio to 11 to 13, for example. The seed crystals may contain a hydroxide containing nickel and cobalt in desired proportions, for example. The mixed solution may be prepared by dissolving nickel salt and cobalt salt in water at a desired ratio. Examples of the nickel salt and the cobalt salt may contain sulfate, nitrate, and hydrochloride. In addition to the nickel salt and the cobalt salt, the mixed solution may contain other metal salts as necessary in a desired constituent ratio. The temperature in the seed generation step may be 40° C. to 80° C., for example. The atmosphere in the seed generation step may be a low oxidation atmosphere, and the oxygen concentration is preferably maintained at 10 vol % or less, for example.

In the crystallization step, the generated seed crystals are grown to obtain a precipitate containing nickel and cobalt having desired characteristics. For example, the seed crystals may be grown by adding a mixed solution containing nickel and cobalt ions and other metal ions as necessary to a liquid medium containing the seed crystals while maintaining the pH at, for example, 7 to 12.5, preferably 7.5 to 12. The addition time of the mixed solution is, for example, 1 hour to 24 hours, preferably 3 hours to 18 hours. The temperature at the crystallization step may be 40° C. to 80° C., for example. The atmosphere at the crystallization step is the same as the seed generation step. The pH may be adjusted in the seed generation step and the crystallization step by using an acidic aqueous solution such as a sulfuric acid aqueous solution and a nitric acid aqueous solution, an alkaline aqueous solution such as a sodium hydroxide aqueous solution and ammonia water, etc.

In the step of obtaining a composite oxide, the precipitate containing composite hydroxide obtained in the crystallization step is heat-treated to obtain a composite oxide. The heat treatment may be performed, for example, by heating the composite hydroxide at a temperature of 500° C. or less, preferably at 350° C. or less. The temperature of the heat treatment is, for example, 100° C. or more, preferably 200° C. or more. The duration of the heat treatment may be, for example, 0.5 hours to 48 hours, preferably 5 hours to 24 hours. The atmosphere of the heat treatment may be the air or an atmosphere containing oxygen. The heat treatment may be performed by using a box furnace, a rotary kiln furnace, a pusher furnace, or a roller hearth kiln furnace, for example.

The obtained composite oxide may contain the other metal element $M^1$ in addition to nickel and cobalt. The other metal element $M^1$ may be Mn, Al, etc., and is preferably at least one selected from the group consisting of these elements, and it is more preferable that at least Mn is contained. When the composite oxide contains the other metal, the mixed solution for obtaining the precipitate may contain the other metal ions in a desired configuration. As a result, nickel, cobalt, and the other metal are contained in the precipitate, and the precipitate is heat-treated to obtain the composite oxide having a desired composition.

The average particle diameter of the composite oxide may be, for example, 2 μm or more and 30 μm or less, preferably 3 μm or more and 25 μm or less. The average particle diameter of the composite oxide is a volume average particle diameter, and is a value at which a volume integrated value from the small diameter side is 50% in a volume-based particle diameter distribution obtained by a laser scattering method.

In the synthesis step, a mixture containing lithium obtained by mixing a composite oxide and a lithium compound is heat-treated to obtain a heat-treated product. The obtained heat-treated product has a layered structure and contains the lithium transition metal composite oxide containing nickel and cobalt.

Examples of the lithium compound mixed with the composite oxide may include lithium hydroxide, lithium carbonate, lithium oxide, etc. The particle diameter of the lithium compound used for mixing is, for example, 0.1 μm or more and 100 μm or less, preferably 2 μm or more and 20 μm or less, as a 50% average particle diameter of the volume-based cumulative particle size distribution.

The ratio of the number of moles of lithium to the total number of moles of metal elements constituting the composite oxide in the mixture may be, for example, 0.95 or more and 1.5 or less. The composite oxide and the lithium compound can be mixed by using a high-speed shear mixer, for example.

The mixture may further contain the other metal element $M^2$ other than lithium, nickel, and cobalt. The other metal element $M^2$ may be B, Na, Mg, Si, P, S, K, Ca, Ti, V, Cr, Zn, Sr, Y, Zr, Nb, Mo, In, Sn, Ba, La, Ce, Nd, Sm, Eu, Gd, Ta, W, Bi, etc., and is preferably at least one selected from the group consisting of these elements. When the mixture contains the other metal, the mixture may be obtained by mixing a simple substance or metal compound of the other metal with the composite oxide and the lithium compound. Examples of the metal compound containing the other metal may include oxides, hydroxides, chlorides, nitrides, carbonates, sulfates, nitrates, acetates, oxalates, etc.

When the mixture contains the other metal, the ratio of the total number of moles of the metal elements constituting the composite oxide to the total number of moles of the other metal may be, for example, 1:0.015 to 1:0.1, preferably 1:0.025 to 1:0.05.

The heat treatment temperature of the mixture may be, for example, 550° C. or higher and 1100° C. or lower, preferably 600° C. or higher and 1080° C. or lower, and more preferably 700° C. or higher and 1080° C. or lower. The heat treatment of the mixture may be performed at a single temperature or is preferably performed at multiple temperatures from the viewpoint of discharge capacity at high voltage. In the case of the heat treatment at multiple temperatures, for example, it is desirable that after maintaining a first temperature for a predetermined time, the temperature is further raised and maintained at a second temperature for a predetermined time. The first temperature may be, for example, 850° C. or higher and 950° C. or lower, preferably 900° C. or higher and 940° C. or lower. The second temperature may be, for example, 980° C. or higher and 1100° C. or lower, preferably 1000° C. or higher and 1080° C. or lower. The difference between the first temperature and the second temperature may be, for example, 30° C. or more, preferably 100° C. or more, and for example, 250° C. or less, preferably 180° C. or less.

The heat treatment time in the case of heat treatment at a single temperature may be, for example, 1 hour or more and 20 hours or less, preferably 5 hours or more and 10 hours or less. When the heat treatment is performed at multiple temperatures, the heat treatment time at the first temperature may be, for example, 1 hour or more and 20 hours or less, preferably 5 hours or more and 10 hours or less. The heat treatment time at the second temperature may be, for example, 1 hour or more and 20 hours or less, preferably 2 hours or more and 10 hours or less. The heat treatment time at the first temperature and the heat treatment time at the second temperature may be the same or different. When the heat treatment time at the first temperature and the heat treatment time at the second temperature are different, for example, the heat treatment time at the first temperature can be made longer than the heat treatment time at the second temperature. Specifically, for example, the heat treatment time at the second temperature may be 1.05 to 2 times, preferably 1.1 to 1.5 times the heat treatment time at the first temperature. In this case, the first heat treatment and the heat treatment time at the second temperature may be performed continuously or independently of each other. When the heat treatment time at the first temperature and the heat treatment time at the second temperature are continuously performed, the rate of temperature rise from the first temperature to the second temperature can be 5° C./min, for example.

The atmosphere of the heat treatment may be the air or an atmosphere containing oxygen. The heat treatment may be performed by using a box furnace, a rotary kiln furnace, a pusher furnace, or a roller hearth kiln furnace, for example.

The heat-treated product may be subjected to a dispersion treatment as necessary. By dissociating the sintered primary particles by the dispersion treatment instead of pulverization treatment associated with strong shearing force and impact, the lithium transition metal composite oxide-containing particles having a narrow particle size distribution and uniform particle size may be obtained. The dispersion treatment may be performed in a dry process or a wet process and is preferably performed in a dry process. The dispersion treatment may be performed by using a ball mill or a jet mill, for example. The conditions for the dispersion treatment may be set so that, for example, $D_{50}/D_{SEM}$ of the lithium transition metal composite oxide-containing particles after the dispersion treatment may be in a desired range, for example, 1 or more and 4 or less.

For example, when the dispersion treatment is performed by a ball mill, a resin medium may be used. Examples of the material of the resin media include urethane resin and nylon resin. Generally, alumina, zirconia, etc., are used as the material of the media of the ball mill, and the particles are pulverized by these media. On the other hand, by using the resin media, the sintered primary particles are dissociated without being pulverized. The size of the resin media may be ø5 mm to 30 mm, for example. For a body (shell), for example, urethane resin, nylon resin, etc., may be used. The duration of the dispersion treatment may be, for example, 3 to 60 minutes, preferably 10 to 30 minutes. For conditions of the dispersion treatment using the ball mill, an amount of the media, a rotation or amplitude speed, a dispersion time, media specific gravity, etc., may be adjusted so that desired $D_{50}/D_{SEM}$ can be achieved.

For example, when the dispersion treatment is performed by a jet mill, a supply pressure, a pulverization pressure, etc., may be adjusted so that desired $D_{50}/D_{SEM}$ can be achieved without pulverizing the primary particles. The supply pressure may be in a range of 0.1 to 0.5 MPa, for example, and the pulverization pressure may be in a range of 0.1 to 0.6 MPa, for example. By the preparation method described above, a single-particle lithium transition metal composite oxide may be efficiently be produced.

Adhesion Step

In the adhesion step, the provided lithium transition metal composite oxide and the cobalt compound are brought into contact with each other to obtain an adhered material in which the cobalt compound adheres to the surfaces of the lithium transition metal composite oxide-containing particles. The contact between the lithium transition metal composite oxide and the cobalt compound may be achieved in a dry process or a wet process. In the case of the dry process, for example, a high-speed shearing mixer etc., can be used to mix and bring the lithium transition metal composite oxide and the cobalt compound into contact with each other. Examples of the cobalt compound include cobalt hydroxide, cobalt oxide, and cobalt carbonate.

In the case of the wet process, the lithium transition metal composite oxide may be brought into contact with a liquid medium containing the cobalt compound to bring the lithium transition metal composite oxide and the cobalt compound into contact with each other. In this case, the liquid medium may be stirred if necessary. The liquid medium containing the cobalt compound may be a solution of the cobalt compound or a dispersion liquid of the cobalt compound. Alternatively, the lithium transition metal composite oxide may be suspended in a solution of the cobalt compound, and the cobalt compound is precipitated in the solution by pH adjustment, temperature adjustment, etc., to cause the cobalt compound to adhere to the surfaces of the lithium transition metal composite oxide-containing particles.

Examples of the cobalt compound contained in the solution comprise cobalt sulfate, cobalt nitrate, cobalt chloride, etc. Examples of the cobalt compound contained in the dispersion liquid include cobalt hydroxide, cobalt oxide, and cobalt carbonate. The liquid medium may contain water, for example, and may contain a water-soluble organic solvent such as alcohol in addition to water. The concentration of the cobalt compound in the liquid medium may be, for example, 1 mass % or more and 8.5 mass % or less.

A total amount of the cobalt compound brought into contact with the lithium transition metal composite oxide may be, for example, 1 mol % or more and 20 mol % or less, preferably 3 mol % or more and 15 mol % or less, based on cobalt, relative to the lithium transition metal composite oxide.

The contact temperature between the lithium transition metal composite oxide and the cobalt compound may be, for example, 20° C. or higher and 80° C. or lower, preferably 40° C. or higher and 80° C. or lower, or 40° C. or higher and 60° C. or lower. The contact time may be, for example, 30 minutes or more and 180 minutes or less, preferably 30 minutes or more and 60 minutes or less.

After contact with the liquid medium containing the cobalt compound, if necessary, the lithium transition metal composite oxide with the cobalt compound adhering thereto may be subjected to treatments such as filtration, water washing, and drying. A preliminary heat treatment may be performed depending on a type of the adhering cobalt compound. When the preliminary heat treatment is performed, the temperature may be, for example, 100° C. or higher and 350° C. or lower, preferably 120° C. or higher and 320° C. or lower. The treatment time may be, for example, 5 hours or more and 20 hours or less, preferably 8 hours or more and 15 hours or less. The atmosphere of the preliminary heat treatment may be, for example, an atmosphere containing oxygen and may be the air atmosphere.

Heat Treatment Step

In the heat treatment step, the adhered material obtained in the adhesion step is heat-treated at a predetermined temperature higher than 700° C. and less than 1100° C. to obtain a heat-treated product. The obtained heat-treated product may be a positive electrode active material containing a lithium transition metal composite oxide having a high cobalt concentration near the surfaces of the particles, and in a non-aqueous electrolyte secondary battery formed by using the material, good output characteristics can be achieved.

The adhered material to be subjected to the heat treatment may be a mixture with a lithium compound. Therefore, the method of producing may include a mixing step of mixing the adhered material and the lithium compound to obtain a mixture before the heat treatment step. By heat-treating the adhered material together with the lithium compound at a predetermined temperature, the output characteristics of the non-aqueous electrolyte secondary battery may further be improved.

Examples of the lithium compound mixed with the adhered material include lithium hydroxide, lithium carbonate, lithium chloride, etc. Regarding an additive amount of the lithium compound, the mixing is performed such that a molar ratio of lithium and cobalt (Li:Co) with respect to an amount of cobalt caused to adhere in the adhesion step may be 0.95 to 1.50:1, preferably 1.00 to 1.30:1, for example. The mixing may be performed by using a high-speed shear mixer, for example.

The temperature of the heat treatment of the adhered material may be, for example, higher than 700° C. and less than 1100° C. The lower limit of the heat treatment temperature is preferably 750° C. or higher, more preferably 800° C. or higher, and particularly preferably 860° C. or higher. The upper limit of the heat treatment temperature is preferably 1080° C. or lower, more preferably 1060° C. or lower, further preferably 1020° C. or lower, and particularly preferably 1000° C. or lower. The heat treatment time may be, for example, 1 hour or more and 20 hours or less, preferably 3 hours or more and 10 hours or less. The atmosphere of the heat treatment may be, for example, an atmosphere containing oxygen, and may be the air atmosphere.

The heat-treated product after the heat treatment may be subjected to treatments such as crushing, pulverization, classification operation, and granulating operation, if necessary.

The heat-treated product obtained as described above contains the lithium transition metal composite oxide-containing particles in the form of single particles, and the concentration of cobalt is high in the vicinity of the surfaces of the particles. Therefore, in the lithium transition metal composite oxide-containing particles, the ratio of the number of moles of cobalt to the total number of moles of metals other than lithium may be larger in the second region where the depth from the particle surface is about 10 nm or less or near 10 nm than in the first region where the depth from the particle surface is about 500 nm. The depth of the first region from the particle surface may be 450 nm to 550 nm, for example, and the depth of the second region from the particle surface may be 5 nm to 15 nm, for example.

Positive Electrode Composition Provision Step

In a positive electrode composition provision step, a positive electrode composition is obtained that contains the lithium transition metal composite oxide obtained as the heat-treated product, a conductive auxiliary agent, and a binder. The positive electrode composition may be prepared, for example, by dispersing and dissolving the lithium transition metal composite oxide obtained as the heat-treated product, the conductive auxiliary agent, and the binder in a liquid medium.

The content of the heat-treated product in the positive electrode composition may be, for example, 70 mass % or more and 99 mass % or less, preferably 80 mass % or more and 98 mass % or less, based on the total solid content of the positive electrode composition.

Examples of the conductive auxiliary agent include: graphite such as natural graphite and artificial graphite; carbon black such as acetylene black, Ketjenblack, channel black, furnace black, lamp black, and thermal black; conductive fibers such as carbon fiber and metal fiber; carbon materials such as graphene and carbon nanotube; carbon fluoride; metal powder of aluminum, nickel, etc.; conductivity whiskers of zinc oxide, potassium titanate, etc.; conductive metal oxide such as titanium oxide; and conductive materials such as polyphenylene derivatives. One of these may be used alone or two or more may be used in combination. The content of the conductive auxiliary agent in the positive electrode composition may be, for example, 0.5 mass % or 10 mass %, preferably 1 mass % or more and 5 mass % or less based on the total solid content of the positive electrode composition.

The binder is, for example, a material assisting the adhesion between a heat-treated material such as the lithium transition metal composite oxide that is the positive electrode active material and the conductive auxiliary agent, and the adhesion of the positive electrode active material to a collector. Examples of the binder include polyvinylidene fluoride (PVDF), polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene propylene diene rubber (EPDM), sulfonated EPDM, styrene butylene rubber, fluororubber, various copolymers, etc. The content of the binder in the positive electrode composition may be, for example, 0.5 mass % or more and 25 mass % or less, preferably 1 mass % or more and 20 mass % or less, based on the total solid content of the positive electrode composition.

The positive electrode composition may contain an organic solvent as the liquid medium. Examples of the organic solvent include N-methyl-2-pyrrolidone (NMP).

The positive electrode composition may contain a filler as necessary. Examples of the filler include a material that suppresses expansion of the active material layer. Examples of the filler comprise: lithium carbonate; olefin-based polymers such as polyethylene and polypropylene; and fibrous substances such as glass fiber and carbon fiber.

Active Material Layer Forming Step

In the active material layer forming step, the obtained positive electrode composition is applied and pressurized onto the collector to form an active material layer having a density of 2.7 g/cm$^3$ or more and 3.9 g/cm$^3$ or less on the collector. When a positive electrode obtained by forming an active material layer having a specific density by using a positive electrode composition containing a heat-treated product that is a single particle to which cobalt adheres, the positive electrode may further improve the storage characteristics while maintaining the good output characteristics in a non-aqueous secondary battery formed by using the positive electrode.

For the collector, for example, plate-shaped or foil-shaped aluminum, nickel, stainless steel, etc., may be used. The thickness of the collector may be, for example, 3 μm or more and 500 μm or less.

The positive electrode composition may be prepared as a slurry having fluidity, for example. The obtained slurry may be applied onto the collector, dried, and then pressed by a roll press etc., to form the active material layer having a density of 2.7 g/cm$^3$ or more and 3.9 g/cm$^3$ or less. The positive electrode composition may be prepared in a solid state and pressure-bonded onto the collector to form the active material layer having a density of 2.7 g/cm$^3$ or more and 3.9 g/cm$^3$ or less. The density of the active material layer may be, for example, 2.7 g/cm$^3$ or more and 3.9 g/cm$^3$ or less, preferably 2.9 g/cm$^3$ or more and 3.7 g/cm$^3$ or less, more preferably 3.0 g/m$^3$ or more and 3.6 g/cm$^3$ or less, further preferably 3.1 g/m$^3$ or more and 3.5 g/cm$^3$ or less. The density of the active material layer is calculated by dividing the mass of the active material layer by the volume of the active material layer.

The active material layer containing the lithium transition metal composite oxide and having a predetermined density is formed on the collector to produce the positive electrode for a non-aqueous electrolyte secondary battery. A lead electrode may be disposed on the collector as necessary and used for manufacturing a non-aqueous secondary battery.

Positive Electrode for Non-Aqueous Electrolyte Secondary Battery

The positive electrode for a non-aqueous electrolyte secondary battery includes the collector and the active material layer disposed on the collector. The density of the active material layer is, for example, 2.7 g/cm$^3$ or more and 3.9 g/cm$^3$ or less. The active material layer includes: a positive electrode active material comprising or formed of particles containing a lithium transition metal composite oxide comprising or formed of single particles, having a layered structure, and having a ratio of the number of moles of nickel to the total number of moles of metals other than lithium of 0.3 or more and less than 1, and a ratio of the number of moles of cobalt to the total number of moles of metals other than lithium of 0.01 or more and less than 0.5; a conductive auxiliary agent; and a binder.

The positive electrode active material has a ratio $D_{50}/D_{SEM}$ of a 50% particle diameter $D_{50}$ in a volume-based cumulative particle size distribution to an average particle diameter $D_{SEM}$ based on electron microscope observation of 1 or more and 4 or less, comprises or is formed of particles containing the lithium transition metal composite oxide having a layered structure and containing at least nickel and cobalt, and contains the lithium transition metal composite oxide having a ratio of the number of moles of nickel to the total number of moles of metals other than lithium of 0.3 or more and less than 1, and a ratio of the number of moles of cobalt to the total number of moles of metals other than lithium of 0.01 or more and less than 0.5. In the particles containing the lithium transition metal composite oxide, the ratio of the number of moles of cobalt to the total number of moles of metals other than lithium is larger in the second region where the depth from the particle surface is about 10 nm or less than in the first region where the depth from the particle surface is about 500 nm.

In the lithium transition metal composite oxide constituting the positive electrode active material, cobalt may be unevenly distributed and has an increased concentration near the surfaces of the particles. Therefore, the output characteristics may be improved when a battery is formed by using such a positive electrode active material. While the form of cobalt present near the surfaces of the particles is not clear, the cobalt present near the surfaces of the particles is thought to be, for example, in a form in which cobalt is solid-dissolved near the surfaces of the particles of the lithium transition metal composite oxide, in a form in which a compound containing cobalt coats the surfaces of the particles containing the lithium transition metal composite oxide that is a base material.

The effect of improving the output characteristics due to the uneven distribution of cobalt near the surfaces of the particles is more effectively provided in the case of single particles having $D_{50}/D_{SEM}$ of 4 or less as compared to the case of so-called agglomerated particles comprising or composed of a large number of agglomerated primary particles and having $D_{50}/D_{SEM}$ greater than 4. For example, this may be considered as follows. Because a three-dimensional grain boundary network may be formed in the agglomerated particles, the output characteristics is thought to be improved by grain boundary conduction. On the other hand, while it is difficult to fully utilize grain boundary conduction in the single particles, it is thought that an improvement in lithium conductivity due to cobalt unevenly distributed near the surface of the particles can be more effectively achieved, allowing further improvement in the output characteristics.

$D_{50}/D_{SEM}$ of the lithium transition metal composite oxide-containing particles contained in the positive electrode active material is, for example, 1 or more and 4 or less, and is preferably 3.5 or less, more preferably 3 or less, further preferably 2.5 or less, and particularly preferably 2 or less from the viewpoint of output density. The method of measuring the average particle diameter $D_{SEM}$ and the 50% particle diameter $D_{50}$ based on electron microscope observation is as described above.

The density of the active material layer may be, for example, 2.7 g/m³ or more and 3.9 g/cm³ or less, preferably 2.9 g/m³ or more and 3.7 g/cm³ or less, more preferably 3.0 g/m³ or more 3.6 g/cm³ or less, further preferably 3.1 g/m³ or more and 3.5 g/cm³ or less. When the density of the active material layer is within the range described above, the generation of gas tends to be further reduced. Particularly, when the density of the active material layer is in the range of 3.1 g/m³ or more and 3.5 g/m³ or less, the output characteristics tends to be further maintained while having good storage characteristics. The density of the active material layer is calculated by dividing the mass of the active material layer by the volume of the active material layer. The density of the active material layer may be adjusted by pressurization after applying the positive electrode composition onto the collector.

In the lithium transition metal composite oxide-containing particles, the average particle diameter $D_{SEM}$ based on electron microscope observation may be, for example, 0.1 µm or more and 20 µm or less from the viewpoint of durability. The lower limit of the average particle diameter $D_{SEM}$ based on electron microscope observation is preferably 0.3 µm or more, more preferably 0.5 µm or more, from the viewpoint of output density and electrode plate filling property, and the upper limit is preferably 15 µm or less, more preferably 10 µm or less, further preferably 8 µm or less, and particularly preferably 5 µm or less.

The 50% particle diameter $D_{50}$ of the lithium transition metal composite oxide-containing particles may be, for example, 1 µm or more and 30 µm or less, preferably 1.5 µm or more, more preferably 3 µm or more, and is preferably 10 µm or less, more preferably 5.5 µm or less, from the viewpoint of output density.

$D_{90}/D_{10}$ of the lithium transition metal composite oxide-containing particles may be, for example, 4 or less, and is preferably 3 or less, more preferably 2.5 or less, from the viewpoint of output density. The lower limit of $D_{90}/D_{10}$ is, for example, 1.2 or more.

In lithium transition metal composite oxide-containing particles, the ratio of the number of moles of nickel to the total number of moles of metals other than lithium in the first region having the depth from the particle surface about 500 nm (hereinafter, also simply referred to as "nickel ratio") may be, for example, 0.2 or more, preferably 0.25 or more. The nickel ratio in the first region may be, for example, 1 or less, preferably 0.5 or less. The nickel ratio in the second region having the depth from the particle surface of about 10 nm or less may be, for example, 0.06 or more, preferably 0.1 or more. The nickel ratio in the second region may be, for example, 0.9 or less, preferably 0.5 or less. A value obtained by dividing the nickel ratio in the second region by the nickel ratio in the first region may be, for example, less than 1, preferably 0.9 or less or 0.8 or less. A value obtained by dividing the nickel ratio in the second region by the nickel ratio in the first region may be, for example, 0.02 or more, preferably 0.03 or more or 0.07 or more. The depth of the second region from the particle surface may be, for example, 10 nm or less, or may be near 10 nm.

In the lithium transition metal composite oxide-containing particles, the ratio of the number of moles of cobalt to the total number of moles of metals other than lithium (hereinafter, also simply referred to as "cobalt ratio") may be larger in the second region than in the first region. The cobalt ratio in the first region may be, for example, 0 or more, preferably 0.2 or more. The cobalt ratio in the first region may be, for example, 0.5 or less, preferably 0.4 or less. The cobalt ratio in the second region may be, for example, 0.3 or more, preferably 0.5 or more. The cobalt ratio in the second region may be, for example, 0.9 or less, preferably 0.8 or less. A value obtained by dividing the cobalt ratio of the second region by the sum of the cobalt ratio in the first region and the cobalt ratio in the second region may be, for example, greater than 0.5 and less than 1, preferably 0.55 or more and 0.72 or less.

The nickel ratio and the cobalt ratio in the first region and the second region may be calculated by measuring SEM-EDX in a cross section of the lithium transition metal composite oxide-containing particle.

In the lithium transition metal composite oxide-containing particle, the cobalt ratio may decrease continuously or discontinuously from the particle surface to the inside of the particle. A concentration gradient of cobalt is defined as an absolute value of a value obtained by dividing a difference in the ratio of the number of moles of cobalt to the total number of moles of metals other than lithium in the first region and the second region by a difference in depth of the first region and the second region from the particle surface and may be, for example, greater than 0.00004 (nm⁻¹) and less than 0.00122 (nm⁻¹), preferably 0.00005 (nm⁻¹) or more and 0.0011 (nm⁻¹) or less, or 0.00006 (nm⁻¹) or more and 0.0009 (nm⁻¹) or less. Specifically, the concentration gradient of cobalt may be obtained by dividing a value obtained by subtracting the cobalt ratio in the first region from the cobalt ratio in the second region by a value obtained by subtracting the depth of the second region from the surface from the depth of the first region from the surface.

The composition of the lithium transition metal composite oxide contained in the positive electrode active material may be considered as a composition including a cobalt compound adhering to the composition of the lithium transition metal composite oxide before adhesion of the cobalt compound in the method of producing described above.

The ratio of the number of moles of nickel to the total number of moles of metals other than lithium in the composition of the lithium transition metal composite oxide contained in the positive electrode active material may be, for example, 0.3 or more and less than 1. The lower limit of the ratio of the number of moles of nickel to the total number of moles of metals other than lithium is preferably 0.31 or more, and more preferably 0.32 or more. The upper limit of the ratio of the number of moles of nickel to the total number of moles of metals other than lithium is preferably 0.98 or less, more preferably 0.8 or less, particularly preferably 0.6 or less. When the molar ratio of nickel is within the range described above, a charge/discharge capacity at high voltage and cycle characteristics may be satisfied at the same time in the nonaqueous electrolyte secondary battery.

The ratio of the number of moles of cobalt to the total number of moles of metals other than lithium in the composition of the lithium transition metal composite oxide contained in the positive electrode active material may be, for example, greater than 0 and less than 0.5 or 0.01 or more and less than 0.5 and is preferably 0.15 or more and 0.45 or less, and more preferably 0.3 or more and 0.4 or less from the viewpoint of charge/discharge capacity.

The composition of the lithium transition metal composite oxide contained in the positive electrode active material may further contain at least one metal element $M^1$ selected from the group consisting of manganese and aluminum. When the lithium transition metal composite oxide contains the metal element $M^1$, the ratio of the number of moles of $M^1$ to the total number of moles of metals other than lithium may be, for example, greater than 0 and less than 0.5, and is preferably 0.15 or more and 0.45 or less, more preferably 0.3 or more and 0.4 or less, from the viewpoint of safety.

The composition of the lithium transition metal composite oxide contained in the positive electrode active material may further contain at least one second metal element $M^2$ selected from the group consisting of boron, sodium, magnesium, silicon, phosphorus, sulfur, potassium, calcium, titanium, vanadium, chromium, zinc, strontium, yttrium, zirconium, niobium, molybdenum, indium, tin, barium, lanthanum, cerium, neodymium, samarium, europium, gadolinium, tantalum, tungsten, bismuth, etc. The ratio of the number of moles of $M^2$ to the total number of moles of metals other than lithium may be, for example, 0 or more and 0.1 or less, preferably 0.001 or more and 0.05 or less.

The ratio of the number of moles of lithium to the total number of moles of metals other than lithium in the composition of the lithium transition metal composite oxide contained in the positive electrode active material may be, for example, 0.95 or more and 1.5 or less, preferably 1 or more and 1.3 or less.

In the composition of the lithium transition metal composite oxide contained in the positive electrode active material, the molar ratio of nickel, cobalt, and manganese may be, for example, nickel:cobalt:manganese=(0.3 to 0.95):(0.01 to 0.5):(0 to 0.5), preferably (0.3 to 0.6):(0.15 to 0.45):(0.15 to 0.45), more preferably (0.3 to 0.4):(0.3 to 0.4):(0.3 to 0.4).

When the lithium transition metal composite oxide contained in the positive electrode active material is represented as a composition, for example, a lithium transition metal composite oxide having a composition represented by the following Formula (2) is preferable.

$$Li_q Ni_r Co_s M^1_t M^2_u O_2 \qquad (2)$$

where $0.95 \leq q \leq 1.5$, $0.3 \leq r < 1$, $0.01 \leq s < 0.5$, $0 \leq t < 0.5$, $0 \leq u \leq 0.1$, and $r+s+t+u \leq 1$ are satisfied, $M^1$ is at least one selected from the group consisting of Al and Mn, and $M^2$ is at least one selected from the group consisting of B, Na, Mg, Si, P, S, K, Ca, Ti, V, Cr, Zn, Sr, Y, Zr, Nb, Mo, In, Sn, Ba, La, Ce, Nd, Sm, Eu, Gd, Ta, W, and Bi. Additionally, $0.9 \leq r+s+t+u$ may be satisfied.

The lithium transition metal composite oxide contained in the positive electrode active material preferably has a nickel element disorder of 4.0% or less, more preferably 2.0% or less, further preferably 1.5% or less, which is obtained by an X-ray diffraction method, from the viewpoint of initial efficiency in the non-aqueous electrolyte secondary battery. The nickel element disorder is as described above.

Non-Aqueous Electrolyte Secondary Battery

The non-aqueous electrolyte secondary battery comprises the positive electrode for a non-aqueous electrolyte secondary battery. The non-aqueous electrolyte secondary battery comprises a negative electrode for a non-aqueous electrolyte secondary battery, a non-aqueous electrolyte, a separator, etc., in addition to the positive electrode for a non-aqueous electrolyte secondary battery. For the negative electrode, the non-aqueous electrolyte, the separator, etc., in the non-aqueous electrolyte secondary battery, for example, those for a non-aqueous secondary battery described in Japanese Laid-Open Patent Publication Nos. 2002-075367, 2011-146390, and 2006-12433 (incorporated herein by reference in their entirety) may appropriately be used.

EXAMPLES

The present invention will hereinafter specifically be described with reference to examples; however, the present invention is not limited to these examples.

Reference Example 1

Seed Generation Step

In a reaction tank, 30 kg of water was placed, and nitrogen gas was allowed to flow while stirring at a temperature in the tank set to 40° C. After the oxygen concentration in the space inside the reaction tank was kept at 10 vol % or less, 197 g of a 25 mass % sodium hydroxide aqueous solution was added to adjust the pH value of the solution in the reaction tank to 11 or more. Subsequently, a nickel sulfate solution, a manganese sulfate solution, and a cobalt sulfate solution were mixed to prepare a mixed solution containing nickel ions, manganese ions, and cobalt ions at a molar ratio of 1:1:1 with the total ion concentration of nickel ions, manganese ions, and cobalt ions set to 1.7 mol/L. While stirring the solution in the reaction tank, 4.76 L of the prepared mixed solution was added to prepare a liquid medium containing seed crystals.

Crystallization Step

After the seed generation step, while the temperature is maintained at 40° C., 452 moles of 25 mass % sodium hydroxide and 201 moles of the mixed solution were both put into a reaction tank at a constant flow rate for 18 hours or longer. The pH at this time was maintained at 11.0 to 12.0. An obtained hydroxide containing nickel, manganese, and cobalt had a 50% particle diameter $D_{50}$ of 10.1 μm. The generated precipitate was then washed with water and filtered to obtain a composite hydroxide. The obtained composite hydroxide was heat-treated at 320° C. for 12 hours in the air atmosphere to obtain a composite oxide having a composition ratio of Ni/Co/Mn=0.33/0.33/0.33.

Synthesis Step

The obtained composite oxide and lithium carbonate were mixed at Li:(Ni+Co+Mn)=1.15:1 to obtain a raw material mixture. The obtained raw material mixture was heat-treated in the air at 925° C. for 7.5 hours and then heat-treated at 1060° C. for 4 hours to obtain a heat-treated product. The obtained heat-treated product was subjected to a dispersion treatment to obtain a lithium transition metal composite oxide having a 50% particle diameter $D_{50}$ of 10.5 μm and a composition represented by a composition formula: $Li_{1.14}Ni_{0.33}Co_{0.33}Mn_{0.33}O_2$.

Adhesion Step and Heat Treatment Step

In a reaction tank, 5 kg of the obtained lithium transition metal composite oxide was suspended in 50 kg of water, and the temperature in the tank was set to 40° C. As a cobalt source, 2.2 kg of cobalt sulfate having a concentration of 8.1 mass % was used, and pH 9.5 was achieved by 25% sodium hydroxide while blowing carbon dioxide gas at 0.56 L/min to obtain a cobalt adhered material precursor. An amount of cobalt sulfate used was 6 mol % in terms of cobalt relative to the lithium transition metal composite oxide. The generated cobalt adhered material precursor was then washed with water and filtered to obtain a composite hydroxide. The obtained composite hydroxide was heat-treated at 300° C. for 12 hours in the air atmosphere to obtain a cobalt adhered material in which a cobalt compound adheres to the lithium transition metal composite oxide. Subsequently, lithium hydroxide was mixed so that the molar ratio of added cobalt and lithium was Li:Co=1.15:1 to obtain a mixture. The obtained mixture was heat-treated at 1000° C. in the air for 3 hours. The obtained heat-treated product was put through a dry sieve to obtain a positive electrode active material containing the lithium transition metal composite oxide having a composition represented by $Li_{1.14}Ni_{0.313}Co_{0.374}Mn_{0.313}O_2$. Table 1 shows the physical property values of the obtained positive electrode active material.

Reference Example 2

The positive electrode active material of Reference Example 2 was produced as in Reference Example 1 except that the heat treatment temperature of the mixture was changed to 900° C. as shown in Table 1.

Reference Example 3

The positive electrode active material of Reference Example 3 was produced as in Reference Example 1 except that the heat treatment temperature of the mixture was changed to 850° C. as shown in Table 1.

Reference Example 4

The lithium transition metal composite oxide obtained in the synthesis step of Reference Example 1 was used as the positive electrode active material of Reference Example 4.

Reference Example 5

The positive electrode active material of Reference Example 5 was produced as in Reference Example 1 except that the heat treatment temperature of the mixture was changed to 1100° C. as shown in Table 1.

Reference Example 6

The positive electrode active material of Reference Example 6 was produced as in Reference Example 1 except that the heat treatment temperature of the mixture was changed to 700° C. as shown in Table 1.

Reference Example 7

The composite oxide obtained in the crystallization step of Reference Example 1 and lithium carbonate were mixed at Li:(Ni+Co+Mn)=1.15:1 to obtain a raw material mixture. The obtained raw material mixture was heat-treated in the air at 930° C. for 12 hours to obtain a heat-treated product. The obtained heat-treated product was subjected to a dispersion treatment to obtain a positive electrode active material containing the lithium transition metal composite oxide having a 50% particle diameter $D_{50}$ of 9.6 μm and a composition represented by a composition formula:

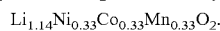
$Li_{1.14}Ni_{0.33}Co_{0.33}Mn_{0.33}O_2$.

Reference Example 8

In a reaction tank, 5 kg of the lithium transition metal composite oxide obtained in Reference Example 7 was suspended in 50 kg of water, and the temperature in the tank was set to 40° C. Using 2.2 kg of cobalt sulfate having a concentration of 8.1 mass % as a cobalt source, pH 9.5 was achieved by 25% sodium hydroxide while blowing carbon dioxide gas at 0.56 L/min to obtain a cobalt adhered material precursor. The generated cobalt adhered material precursor was then washed with water and filtered to obtain a composite hydroxide. The obtained composite hydroxide was heat-treated at 300° C. for 12 hours in the air atmosphere to obtain a cobalt adhered material. Subsequently, lithium hydroxide was mixed so that the ratio of added cobalt and lithium was Li:Co=1.15:1 to obtain a mixture. The obtained mixture was heat-treated at 900° C. in the air for 3 hours. The obtained heat-treated product was put through a dry sieve to obtain a positive electrode active material containing the lithium transition metal composite oxide having a composition represented by $Li_{1.14}Ni_{0.313}Co_{0.374}Mn_{0.313}O_2$.

Particle Diameter Evaluation

For the positive electrode active material obtained as described above, the physical property values were measured as follows. $D_{50}$ was obtained by measuring the volume-based cumulative particle size distribution by using a laser diffraction particle size distribution measuring device (SALD-3100 manufactured by Shimadzu Corporation) as the particle diameter corresponding to 50% accumulation from the small diameter side. For the average particle diameter $D_{SEM}$ based on electron microscope observation, 100 particles having confirmable particle contours are selected in images observed at 1000 to 10000 times of magnification by using a scanning electron microscope (SEM) to calculate sphere-equivalent diameters of the selected particles by using image processing software (ImageJ), and an arithmetic mean value of the obtained sphere-equivalent diameters was obtained.

Evaluation of Cobalt Distribution and Nickel Distribution

For the positive electrode active material obtained as described above, the cobalt distribution and the nickel distribution inside the particles were evaluated. Specifically, the nickel content and the cobalt content in the first region and the second region were evaluated as follows.

Composition Analysis

After each of the positive electrode active materials obtained in Reference Examples 1 to 8 was dispersed and solidified in an epoxy resin, a cross section of the secondary particle of the positive electrode active material was exposed by using a cross section polisher (manufactured by JEOL Ltd.) to produce a measurement sample. At one point each in the first region (500 nm) and the second region (10 nm) of the measurement sample, an intensity ratio of each of the metal components other than lithium was obtained by a scanning electron microscope (SEM)/energy dispersive X-ray analysis (EDX) device (manufactured by Hitachi High-Tech Corporation; acceleration voltage: 3 kV). The cobalt ratio was defined as an intensity ratio of cobalt to the sum of the intensity ratios of the metal components other than lithium, and the nickel ratio was defined as an intensity ratio of nickel to sum of the intensity ratios of the metal components other than lithium.

Scanning Electron Microscope Observation

Figure 2:
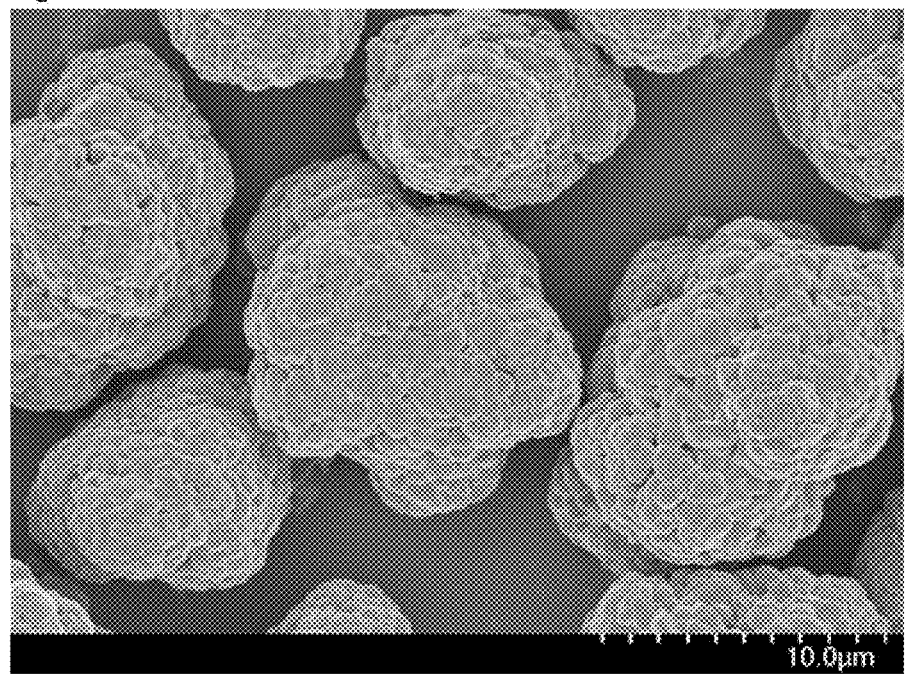
FIG. 2 is an exemplary SEM image of a positive electrode active material according to Reference Example 8.

SEM images of the positive electrode active materials obtained in Reference Examples 1 and Reference Example 8 were obtained by using a scanning electron microscope (SEM; acceleration voltage: 1.5 kV). The SEM image of the positive electrode active material of Reference Example 1 is shown in FIG. 1, and the SEM image of the positive electrode active material of Reference Example 8 is shown in FIG. 2.

Fabrication of Evaluation Batteries

Evaluation batteries were fabricated by using the positive electrode active materials obtained as described above by the following procedure.

Fabrication of Positive Electrode

A positive electrode composition was fabricated by dispersing 90 parts by mass of the positive electrode active material, 5 parts by mass of acetylene black, and 5 parts by mass of polyvinylidene fluoride (PVDF) in N-methyl-2-pyrrolidone (NMP). The obtained positive electrode composition was applied to an aluminum foil serving as a collector, dried, compression-molded by a roll press machine to the density of the active material layer of 3.2 g/cm$^3$, and then cut into a predetermined size to fabricate a positive electrode.

pack under an argon atmosphere to fabricate the evaluation battery. The electrolytic solution used was obtained by mixing ethylene carbonate (EC) and methyl ethyl carbonate (MEC) at a volume ratio of 3:7 and dissolving lithium hexafluorophosphate (LiPF$_6$) at a concentration of 1 mol/L. After the evaluation battery obtained in this way was placed in a constant temperature bath at 25° C. and aged with a weak current, the following evaluation was performed.

Measurement of DC Internal Resistance

The evaluation battery after aging was placed under environments of −25° C. to measure DC internal resistance. Constant-current charge to a charge depth of 50% at a full-charge voltage of 4.75 V was followed by pulse discharge with a specific current i for 10 seconds, and a voltage V at the tenth second was measured. Intersections were plotted by using the current i on the horizontal axis and the voltage V on the vertical axis, and an inclination of a straight line connecting the intersections was defined as DC internal resistance (DC-IR). The current i was set to 0.03 A, 0.05 A, 0.08 A, 0.105 A, and 0.13 A. The low DC-IR indicates that the output characteristics are good.

TABLE 1

| | Heat treatment temperature (° C.) | $D_{50}$ (μm) | $D_{SEM}$ (μm) | $D_{50}/D_{SEM}$ | Nickel ratio | | Cobalt ratio | | | DC-IR (Ω) −25° C. |
| --- | --- | --- | --- | --- | --- | --- | --- | --- | --- | --- |
| | | | | | Second region | First region | Second region | First region | Concentration gradient | |
| Reference Example 1 | 1000 | 13.3 | 7.9 | 1.70 | 0.28 | 0.26 | 0.55 | 0.35 | 0.00041 | 17.0 |
| Reference Example 2 | 900 | 12.8 | 7.8 | 1.64 | 0.22 | 0.28 | 0.69 | 0.34 | 0.00071 | 17.0 |
| Reference Example 3 | 850 | 11.8 | 7.6 | 1.55 | 0.15 | 0.28 | 0.74 | 0.35 | 0.00079 | 17.2 |
| Reference Example 4 | — | 10.5 | 7.5 | 1.40 | 0.28 | 0.27 | 0.34 | 0.33 | 0.00002 | 27.1 |
| Reference Example 5 | 1100 | 15.0 | 7.6 | 1.99 | 0.27 | 0.25 | 0.38 | 0.36 | 0.00004 | 38.6 |
| Reference Example 6 | 700 | 11.1 | 8.3 | 1.33 | 0.02 | 0.28 | 0.94 | 0.34 | 0.00122 | 49.7 |
| Reference Example 7 | — | 9.6 | 0.7 | 14.33 | 0.25 | 0.26 | 0.30 | 0.30 | 0.00000 | 16.6 |
| Reference Example 8 | 900 | 9.6 | 0.7 | 13.33 | 0.23 | 0.23 | 0.70 | 0.30 | 0.00081 | 13.6 |

Fabrication of Negative Electrode

A negative electrode slurry was prepared by dispersing and dissolving 97.5 parts by mass of artificial graphite, 1.5 parts by mass of carboxymethyl cellulose (CMC), and 1.0 part by mass of SBR (styrene butadiene rubber) in pure water. The obtained negative electrode slurry was applied to a collector made of copper foil, dried, compression-molded by a roll press machine, and cut into a predetermined size to fabricate a negative electrode.

Fabrication of Evaluation Battery

After respective lead electrodes were attached to the collectors of the positive and negative electrodes, a separator is arranged between the positive electrode and the negative electrode, and these were stored in a bag-shaped laminate pack. Vacuum drying was then performed at 65° C. to remove water adsorbed in the members. Subsequently, an electrolytic solution was injected and sealed in the laminate When the battery is configured to contain the positive electrode active material having $D_{50}/D_{SEM}$ of 1 or more and 4 or less and the cobalt ratio in the second region larger than the cobalt ratio in the first region like the positive electrode active materials of reference Examples 1 to 3, the output characteristics are improved as compared to reference Examples 4 to 6.

TABLE 2

| | DC-IR (Ω) | |
| --- | --- | --- |
| | −25° C. (Ω) | Improvement rate (%) |
| Reference Example 2 | 17.0 | 37.3 |
| Reference Example 4 | 27.1 | Reference |

TABLE 3

|  | DC-IR (Ω) | |
| --- | --- | --- |
|  | −25° C. (Ω) | Improvement rate (%) |
| Reference Example 7 | 16.6 | Reference |
| Reference Example 8 | 13.6 | 18.1 |

Tables 2 and 3 show an improvement rate of the output characteristics of the lithium transition metal composite oxide obtained by the method of producing comprising the cobalt adhesion step and the treatment step when the lithium transition metal composite oxide obtained by the method of producing without the cobalt adhesion step and the heat treatment step is used as a reference. It was confirmed that the effect in the method of producing comprising the cobalt adhesion step and the heat treatment step in the references example in Table 2 was larger as compared to the effect in the method of producing comprising the cobalt adhesion step and the heat treatment step using agglomerated particles in Table 3.

Example 1

The positive electrode of Example 1 was obtained by using the positive electrode active material of Reference Example 1 in the same manner as in the fabrication of the positive electrode except that a positive electrode composition was prepared by dispersing 92 parts by mass of the positive electrode active material, 3 parts by mass of acetylene black, and 5 parts by mass of polyvinylidene fluoride (PVDF) in N-methyl-2-pyrrolidone (NMP) and that the compression molding was performed to the density of the active material layer of 2.9 g/cm$^3$.

Example 2

The positive electrode of Example 2 was obtained by using the positive electrode active material of Reference Example 1 in the same manner as in the fabrication of the positive electrode except that the compression molding was performed to the density of the active material layer of 3.1 g/cm$^3$.

Example 3

The positive electrode of Example 3 was obtained by using the positive electrode active material of Reference Example 1 in the same manner as in the fabrication of the positive electrode except that the compression molding was performed to the density of the active material layer of 3.3 g/cm$^3$.

Example 4

The positive electrode of Example 4 was obtained by using the positive electrode active material of Reference Example 1 in the same manner as in the fabrication of the positive electrode except that the compression molding was performed to the density of the active material layer of 3.5 g/cm$^3$.

Example 5

The positive electrode of Example 5 was obtained by using the positive electrode active material of Reference Example 1 in the same manner as in the fabrication of the positive electrode except that the compression molding was performed to the density of the active material layer of 3.7 g/cm$^3$.

Evaluation of Storage Characteristics

By using the positive electrodes of Examples 1 to 5, respective evaluation batteries were fabricated with the positive electrode active material under the conditions of fabrication of the evaluation battery described above for measuring a gas generation amount. After putting the evaluation battery in a constant temperature bath at 25° C., charge/discharge was performed three times under the conditions of 2.75V to 4.25V by using a charge/discharge test device ("TOSCAT" manufactured by Toyo System). After three times of charge/discharge, 4.25V constant-current constant-voltage charging was performed at a charging speed of 0.2 C at 60° C. for 72 hours by using the charge/discharge test device. After sufficiently cooling the evaluation battery in an atmosphere of 25° C., a volume change of the evaluation battery before and after the constant-current constant-voltage charging was measured to obtain the gas generation amount (cm$^3$) during the constant-current constant-voltage charging. For a standard value obtained by dividing the obtained gas generation amount by the mass of the positive electrode composition, the standard value of each sample was calculated as a relative gas generation amount when the standard value in Example 1 was 1. A volume change was obtained by measuring the volume of the evaluation battery before and after the constant-current constant-voltage charging by using Archimedes' principle and then calculating a difference. Table 4 shows the relative gas generation amount for each density of the active material layer as an index of storage characteristics.

For Examples 1 to 5, the DC internal resistance was measured in the same manner as the measuring method described above. Table 4 shows a relative value of each sample when the DC internal resistance of Example 3 is 1.

TABLE 4

|  | Density (g/cm$^3$) | Relative DC-IR (Ω) −25° C. | Relative gas generation amount |
| --- | --- | --- | --- |
| Example 1 | 2.9 | 1.05 | 1 |
| Example 2 | 3.1 | 0.98 | 0.96 |
| Example 3 | 3.3 | 1 | 0.75 |
| Example 4 | 3.5 | 1.01 | 0.57 |
| Example 5 | 3.7 | 1.07 | 0.50 |

In Table 4, it is confirmed that the gas generation amount can be reduced by increasing the density of the active material layer and that the gas generation can efficiently be suppressed while maintaining the output characteristics at a specific density.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

Although the present disclosure has been described with reference to several exemplary embodiments, it is to be understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular examples, means, and embodiments, the disclosure may be not intended to be limited to the particulars disclosed; rather the disclosure extends to all functionally equivalent structures, methods, and uses such as are within the scope of the appended claims.

One or more examples or embodiments of the disclosure may be referred to herein, individually and/or collectively, by the term "disclosure" merely for convenience and without intending to voluntarily limit the scope of this application to any particular disclosure or inventive concept. Moreover, although specific examples and embodiments have been illustrated and described herein, it should be appreciated that any subsequent arrangement designed to achieve the same or similar purpose may be substituted for the specific examples or embodiments shown. This disclosure may be intended to cover any and all subsequent adaptations or variations of various examples and embodiments. Combinations of the above examples and embodiments, and other examples and embodiments not specifically described herein, will be apparent to those of skill in the art upon reviewing the description.

In addition, in the foregoing Detailed Description, various features may be grouped together or described in a single embodiment for the purpose of streamlining the disclosure. This disclosure may be not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter shall be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure may be determined by the broadest permissible interpretation of the following claims and their equivalents, and shall not be restricted or limited by the foregoing detailed description.

All publications, patent applications, and technical standards mentioned in this specification are herein incorporated by reference to the same extent as if each individual publication, patent application, or technical standard was specifically and individually indicated to be incorporated by reference.

What is claimed is:

1. A positive electrode for a non-aqueous electrolyte secondary battery, comprising:
a collector; and
an active material layer disposed on the collector,
wherein the active material layer has a density of 2.7 g/cm³ or more and 3.9 g/cm³ or less and comprises a positive electrode active material, a conductive auxiliary agent, and a binder,
wherein the positive electrode active material has a ratio $D_{50}/D_{SEM}$ of 1 or more and 4 or less, wherein $D_{50}$ is a 50% particle diameter in a volume-based cumulative particle size distribution and $D_{SEM}$ is an average particle diameter based on electron microscope observation,
wherein the positive electrode active material comprises particles having a layered structure and containing at least nickel and cobalt,
wherein the positive electrode active material has a ratio of a number of moles of nickel to a total number of moles of metals other than lithium of 0.3 or more and less than 1, and a ratio of a number of moles of cobalt to the total number of moles of metals other than lithium of 0.01 or more and less than 0.5,
wherein a ratio of a number of moles of cobalt to a total number of moles of metals other than lithium in a second region where a depth from a particle surface is about 10 nm or less is larger than a ratio of a number of moles of cobalt to a total number of moles of metals other than lithium in a first region where a depth from the particle surface is about 500 nm,
wherein a value obtained by dividing a difference in the ratio of the number of moles of cobalt to the total number of moles of metals other than lithium in the first region and the second region by a difference in depth of the first region and the second region from the particle surface, has an absolute value that is 0.00041 (nm⁻¹) or more and 0.00079 (nm⁻¹) or less, and
wherein the number of moles of cobalt to the total number of moles of metals other than lithium in the second region is 0.5 or more and 0.8 or less.

2. The positive electrode for a non-aqueous electrolyte secondary battery according to claim 1, wherein
the positive electrode active material has a composition represented by the following formula:

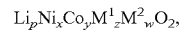

where 0.95≤p≤1.5, 0.3≤x<1, 0≤y<0.5, 0≤z<0.5, 0≤w≤0.1, and x+y+z+w≤1 are satisfied, M¹ contains at least one selected from the group consisting of Al and Mn, and M² contains at least one selected from the group consisting of B, Na, Mg, Si, P, S, K, Ca, Ti, V, Cr, Zn, Sr, Y, Zr, Nb, Mo, In, Sn, Ba, La, Ce, Nd, Sm, Eu, Gd, Ta, W, and Bi.

3. The positive electrode for a non-aqueous electrolyte secondary battery according to claim 1, wherein the positive electrode active material has a ratio of a number of moles of nickel to a total number of moles of metals other than lithium in the first region of 0.2 or more and has a ratio of a number of moles of nickel to a total number of moles of metals other than lithium in the second region of 0.06 or more.

4. The positive electrode for a non-aqueous electrolyte secondary battery according to claim 1, wherein
the density of the active material layer is 3.1 g/cm³ or more and 3.5 g/cm³ or less.

* * * * *